United States Patent
Cousins et al.

(10) Patent No.: US 10,639,794 B2
(45) Date of Patent: May 5, 2020

(54) SYSTEM AND METHOD FOR UTILIZING NON-LOCAL INFORMATION TO CONSTRAIN ROBOT SERVICES

(71) Applicant: Savioke, Inc., San Jose, CA (US)

(72) Inventors: Steve Cousins, San Jose, CA (US); Adrian Canoso, Sunnyvale, CA (US); Robert S. Bauer, Portola Valley, CA (US); Phil Herget, Sunnyvale, CA (US); Izumi Yaskawa, Sunnyvale, CA (US)

(73) Assignee: Savioke, Inc., San Jose, CA (US)

( * ) Notice: Subject to any disclaimer, the term of this patent is extended or adjusted under 35 U.S.C. 154(b) by 363 days.

(21) Appl. No.: 15/817,034

(22) Filed: Nov. 17, 2017

(65) Prior Publication Data
US 2018/0333853 A1    Nov. 22, 2018

Related U.S. Application Data

(63) Continuation of application No. 15/598,130, filed on May 17, 2017, now Pat. No. 9,844,879.

(51) Int. Cl.
| | |
|---|---|
| *G05B 19/04* | (2006.01) |
| *G05B 19/18* | (2006.01) |
| *B25J 9/16* | (2006.01) |
| *G05D 1/02* | (2020.01) |
| *G01C 21/34* | (2006.01) |
| *G01C 21/36* | (2006.01) |

(52) U.S. Cl.
CPC ........ *B25J 9/1666* (2013.01); *G01C 21/3461* (2013.01); *G01C 21/3691* (2013.01); *G01C 21/3697* (2013.01); *G05D 1/0217* (2013.01); *G05D 1/0274* (2013.01); *G05D 1/0276* (2013.01); *G05D 2201/0206* (2013.01); *Y10S 901/01* (2013.01)

(58) Field of Classification Search
None
See application file for complete search history.

(56) References Cited

U.S. PATENT DOCUMENTS 9,844,879 B1 * 12/2017 Cousins ................. B25J 9/1666

* cited by examiner

*Primary Examiner* — Bhavesh V Amin
(74) *Attorney, Agent, or Firm* — Hickman Palermo Becker Bingham LLP

(57) ABSTRACT

A method for constraining movements of a robot comprises: obtaining digitally stored dynamic building data describing a set of one or more temporary conditions, the dynamic building data comprising, for each temporary condition of the set of one or more temporary conditions, a location of the temporary condition and a description of the temporary location; updating, from the dynamic building data, digital cost data associated with one or more features of a digital map by calculating, for each temporary condition of the set of one or more temporary conditions, an increased cost of navigation associated with the location of the temporary condition; in response to receiving a task that is associated with a destination location, determining a route of the robot to the destination location using the digital map based in part upon the location of each temporary condition and the increased cost associated with the location, the route not including at least a location of a particular temporary condition of the set of one or more temporary conditions; causing the robot to traverse to the destination location using the route.

20 Claims, 7 Drawing Sheets

600 ⟶

> TASK RECEIVED.
>
> I WILL ARRIVE AT ROOM 314 IN 7 MINUTES.
>
> I ANTICIPATE A 3 MINUTE DELAY BECAUSE WEATHER IS MAKING THE BREEZEWAY TOO WET FOR ME TO NAVIGATE. I WILL BE TRAVELLING ALONG THE SERVICE CORRIDOR INSTEAD.

FIG. 6

SYSTEM AND METHOD FOR UTILIZING NON-LOCAL INFORMATION TO CONSTRAIN ROBOT SERVICES

BENEFIT CLAIM

This application claims the benefit under 35 U.S.C. § 120 as a Continuation of application Ser. No. 15/598,130, filed May 17, 2017, the entire contents of which are hereby incorporated by reference for all purposes as if fully set forth herein. The applicant(s) hereby rescind any disclaimer of claim scope in the parent applications or the prosecution history thereof and advise the USPTO that the claims in this application may be broader than any claim in the parent application(s).

FIELD OF THE DISCLOSURE

The present disclosure relates to mobile digital computer controlled robots that autonomously navigate a bounded area and, more specifically, to computer-implemented techniques for defining bounded areas for autonomous mobile robot navigation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Robots are no longer only used in manufacturing. Increasingly, robots have been used in hospitality, medicine, and transportation of goods. Some robots, such as those designed and manufactured by Savioke, Inc. of San Jose, Calif., are wheeled machines that transport goods within a campus, such as a hotel or hospital. These robots are deployed by computer or human operators to complete a task, such as delivering hot towels to a guest room. Once deployed, a particular robot may navigate a building or a set of buildings from its current location to its destination.

In order to navigate to its destination, the robot uses data defining a layout of the campus or environment. The data may be stored in the form of a digital map of a campus, building, or floor within a building. However, statically defining an environment has the significant drawback of requiring an update to data storage or memory of the robot when the environment changes as a result of construction, demolition, or changes in security or other operational policy. There is a need in the robotics field to digitally define an environment for robot operation through other than static means.

BRIEF DESCRIPTION OF THE DRAWINGS

In the drawings:

FIG. 6 is an example user interface describing an anticipated route and estimated time of arrival, according to various embodiments.

DETAILED DESCRIPTION

Figure 1:
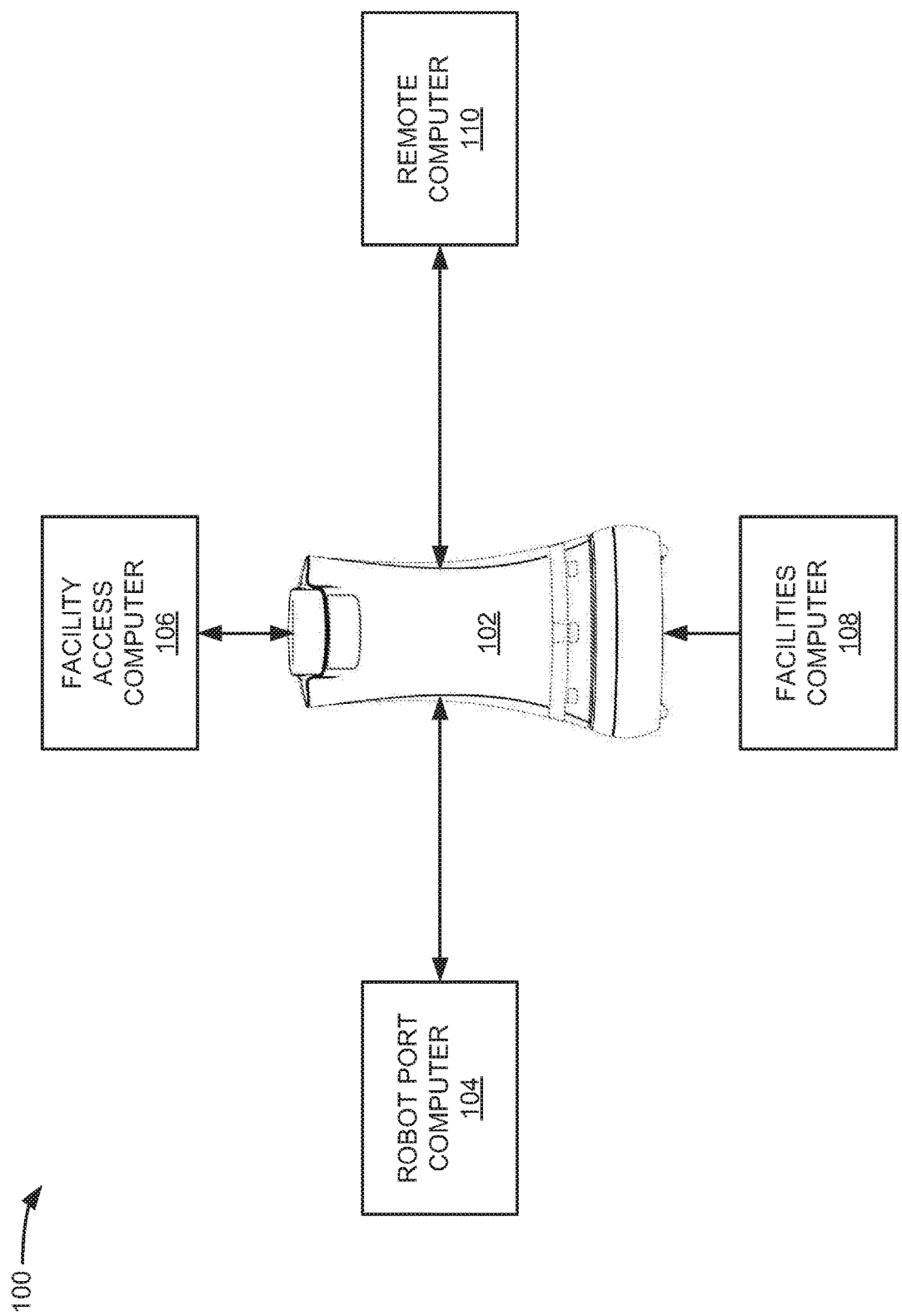
FIG. 1 is a diagram of a networked environment in which a robot may operate, according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, digital computer controlled electro-mechanical autonomous robots may be deployed, for example, within a building, between buildings, or within a campus to transport items between people or locations. For example, in a hotel, a robot may be programmed to transport a warm towel from a housekeeping area or front desk to a guest's room. To deliver the item to its destination, the robot uses a digitally stored map of the building to determine a route and to navigate hallways, elevators, and other features of the environment. Due to minor variations between the actual building and a building plan, a robot typically generates a robot-readable digital map of the actual, physical building by exhaustively navigating through the building before being deployed on a specific task. The digital map data may be used to determine routes of traversal of the robot to perform a particular task. In some cases a route may involve traversing exclusively indoor space inside a building or a plurality of buildings that are linked by corridors, skyways, or other structures; in other cases the best route may require the robot to temporarily exit an indoor environment and travel outdoors to reach the destination.

Furthermore, building structures, environments and conditions may change due to a variety of causes. These causes may include, for example, inclement weather, large events that attract large crowds, temporary decorations and installations, construction zones for remodeling and repairs, events that trigger sensors such as smoke detectors or moisture sensors, and maintenance events such as lawn watering and carpet cleaning. As examples, during rain it may be undesirable for the robot to traverse an exterior path between one or more buildings that is not covered, and during snow an exterior path may become impassable for the robot. A robot may receive changing data, which may be termed dynamic building description data or just dynamic building data, from electronic sensor systems, information feeds, networked online services such as weather services or computers, external scheduling systems, emergency services data and other sources. The dynamic building data may be received at the robot, or a server computer that manages the robot, via API calls transmitted via HTTP, programmatic calls, or other means.

Embodiments have particular applicability to buildings or sets of buildings that feature exterior passages. Examples include single buildings that have an overall plan that is L-shaped, U-shaped, curved, or otherwise non-rectangular, in which a shortest or fastest path from one point to another may involve traversing an exterior space, path, road, or breezeway. A set of one or more buildings may feature such an exterior traversal which, while useful for computing a shortest or fastest path, may be subject to obstruction or obstacles, adverse weather or other conditions.

Robots operate with locally stored information that enable the provision of a service; among these resources are digitally stored maps that comprise one or more logical data layers that define available paths, corridors or hallways, elevators, roads or other traversal surfaces, as well as fixed obstacles and pre-defined places. The performance of robots in delivering the service may be affected by changing environmental conditions, and hence may robots employ onboard or local sensors and stored program logic to adapt to conditions of the environment that differ from their stored information at the time of traversing a route or performing a task; for example, adaptations may include navigating safely around newly encountered obstacles, both stationary and moving. An example of a stationary obstacle is a room service tray in a hallway outside a guest room. An example of a moving obstacle is a person or a second robot that is moving toward or around a first robot.

To provide improved and extended services, the robot uses dynamic building data to include a variety of non-locally stored, real-time information from sources data including remote databases and real-time sensors external to the robot. As an example, information on current weather conditions can enable a natural extension of indoor-based service robots by confirming that the device can (or cannot) safely and effectively traverse between buildings located on campuses, through underground corridors, across sky bridges and using other means. There are inherent challenges traversing outdoor spaces that are either excessively hot or open to inclement weather like dense fog, rain, and snow. Some of the challenges with outdoor navigation are IR radiation blinding on-board navigation sensors, water ingress due to rain and puddles, moisture collection on sensors, and snow affecting maneuverability.

The dynamic building information may be received from outdoor sensors. For example, in one embodiment, digital temperature sensors, rain gauges or other moisture sensors, and ambient light sensors provide digital data values to the robot. These sensors may be located on the robot, or within a local operating environment. When the sensors are separate from the robot, the sensors may be coupled via wireless networking interfaces to a host computer that periodically polls the sensors or periodically receives data updates from the sensors, and then forms and transmits the dynamic building data to the robot. In another embodiment, dynamic building data is formed under program control based upon periodic requests for weather data to networked data sources such as the National Weather Service or others that use cloud hosting and open internet protocols for communications.

Non-local environmental information is also valuable for optimizing robot services that are performed indoors. For example, building condition data can modify a digital map or navigation cost-map at specified time periods that are associated with scheduled or recurring obstructions or obstacles. Example scheduled conditions that could be represented in digitally stored dynamic building data include carpet cleaning, renovations to a hallway or other area that robots traverse, human social events for which human congestion of traversal paths is expected for a time interval, banquet tables, bars, platforms, chairs, carts and other items specified in Banquet Event Orders (BEOs), or seasonal decorations resulting in static obstacles for a defined number of weeks. Information about obstacles in association with time values may be received from a building's infrastructure systems, banquet department computers, or networked distributed sensors. For example, a moisture detector or humidity detector may generate a signal that could be interpreted as indicating that carpets in a particular area were recently cleaned and are too wet for robot traversal.

In an embodiment, dynamic building data based upon local weather data is processed by the robot under program control to result in selecting any of several possible responsive actions. In one embodiment, the responsive action is to automatically limit inter-building movements. For example, during snow, rain or other inclement weather, inter-building service can be automatically made unavailable. Making traversal between buildings unavailable can comprise changing cost values or weight values associated with digital path data in a digital map of a building or campus, for example. In another embodiment, the responsive action may comprise generating and transmitting a weather warning, message or other notification, alone or in conjunction with modifying cost values or weight values of the digital map. For example, a message or notification may be transmitted, generated or displayed, and generating a route or path using the digital map may be skipped or terminated. As one example, there may be no use in generating a path if the only available path would require traversing an outdoor space that is covered with snow. In another embodiment, responsive action comprises adjusting an estimated time of arrival that is calculated and/or displayed at an administrator console or operator center. In another embodiment, responsive action may comprise rejecting the performance of a planned delivery or traversal.

Messages or notifications may be generated and transmitted, or displayed, using a display of the robot, an administrator console or operator center. The operator may be required to have administrative privileges to override the weather warning. In some embodiments, a path planning algorithm considers the weather data and other data sources and provides a changed or different path or route output based upon values of the data. For example, when the weather is good, the robot may use a shorter path that traverses an external unprotected space between buildings or structures, while on days with bad weather the robot may take a longer path to avoid the outdoors.

In an embodiment, a notification may inform the operator so a sender and/or receiver is informed if a delivery will be delayed or cannot happen. In an embodiment, based on the values of the dynamic building data, one or more new ETA estimates are generated before or during navigation to the destination and may be provided in a notification. This information also may be communicated between robots that are deployed on or near the same campus so that the other robots can plan their routes accordingly.

Using these techniques, receiving and using the dynamic building data by the robot itself improves the functioning of the robot itself. If the robot does not modify its behavior in light of changing conditions, the robot may become find itself in a location that it cannot navigate from or may be damaged by moisture, unable to move through or in large crowds, or from other hazards. By adapting its routes to current conditions, the robot is able to complete navigating a route, avoid navigating a route, and/or perform tasks.

2. Networked Environment

FIG. 1 is a diagram of an example networked environment in which a robot may operate, according to various embodiments.

The networked environment 100 of FIG. 1 provides certain computing infrastructure to support a robot 102, to allow the robot 102 to access building features such as locked doors or elevators, and to allow an operator to communicate directly with the robot 102. The networked environment 100 includes the robot and one or more computers that are local to the building or campus in which the robot is deployed. In some embodiments, remote computers may be included in the networked environment 100. The local computers within the networked environment 100 may be physically present in the building.

In this example, the robot 102 is an autonomous, wheeled, battery-powered electro-mechanical robot under control of a programmed digital computer contained in the robot. The robot 102 moves using a set of wheels at a bottom of the robot and coupled to a drive mechanism that operates under stored program control. The robot 102 may move at velocities appropriate to its environment, typically at a human walking speed, faster or slower. In some embodiment, in areas with less human activity, for example hallways where lights are turned off because motion sensors have not been recently activated, the robot 102 may move at higher speeds. The wheels of the robot 102 may be selected for performance on a variety of indoor and outdoor surfaces including tile, carpet, and concrete. In an embodiment, robot 102 may comprise a RELAY robot, commercially available from SAVIOKE, INC. of San Jose, Calif., but including the programmatic and functional features that are described in this disclosure.

In some embodiments, robot 102 includes at least one storage compartment that can be electronically opened by the robot under program control for access by an operator or human at an origin or destination. The storage compartment may be sized to hold items that are appropriate to the environment. For example, in hospitality applications, the storage compartment may permit carrying any of: linens; toiletries; medications; magazines and reading materials; lost and found items such as wallets, keys, and personal electronic devices.

The storage compartment may have an electronic lock that is operable by the robot 102 under program control. In some embodiments, the robot 102 is programmed to open the storage compartment upon arriving at its destination or in response to an instruction or sensor when the destination is reached. The instruction may include, for example, a passcode; a confirmation of the person's identity at the destination; an electronic communication with a personal electronic device of the person receiving the delivery via, for example, RFID or Bluetooth. The storage compartment may include a scale, pressure switch, or other mechanism to detect the placement or removal of items in or from the storage compartment, such that placing an item in the compartment depresses the scale or triggers the switch, and removing the item from the compartment releases the scale or the switch. A digital interface may gate or latch a signal from the scale or switch to instruct the computer in the robot that an item was placed on or removed from the compartment.

In some embodiments, robot 102 includes a touchscreen or other digital computer display device that provides a graphical user interface (GUI) to communicate messages to humans. Robot 102 may be programmed to receive instructions in response to input received via the touchscreen. For example, instructions may include an instruction to open the storage compartment, a response to a request for information presented by the robot during an autonomous mapping operation; a confirmation that the item, or the correct item, is in the storage compartment and is delivered. In some embodiments, robot 102 may include other input mechanisms such as keyboards, buttons, switches, or audio sensors for voice commands.

In an embodiment, the robot 102 includes a plurality of sensors for receiving data about the building and its location within the building. These sensors may include, for example, laser sensors, Light Detection and Ranging (LIDAR) position or motion sensors, 3D cameras, color cameras, barometers, altimeters, accelerometers, and others. In an embodiment, the sensors collect data about an operating environment of the robot 102 that can be transformed under program control to form a digital model in memory of the environment and physical attributes of the environment such as obstructions or objects; dimensions of features such as rooms, hallways, doors, and windows; and identification of features including staircases, elevators, doorways, signs, and fiducials. Feature identification also may include transitory features or movable objects such as room service trays, carts or other wheeled apparatus, and in general any object that could appear or be placed in an operating environment as a result of human activity. In an embodiment, a barometer detects an altitude of the robot 102 based on digitally transforming a reading of ambient atmospheric pressure and provides data that may be used, for example, to identify a floor on which the robot 102 is currently located if the environment is multi-story. In an embodiment, the accelerometer provides data about the speed and/or direction of the movement of the robot 102, alone or in combination with a digital compass.

In an embodiment, the robot 102 includes one or more network interfaces that communicate with the computers within the networked environment 100. The network interfaces may include interfaces that communicate via Wireless Fidelity (WIFI), 3G and/or 4G modems, Bluetooth, infrared, and low-bandwidth radio. In some embodiments, the robot 102 uses a Global Positioning System (GPS) receiver and program control to determine its geographic location. In some embodiments, the robot 102 may communicate with building features using the one or more network interfaces. For example, robot 102 may use wireless networking messages to communicate with a compatible interface of an elevator control system in a building to open doors of elevator cars or to call and direct an elevator car.

In one embodiment, robot 102 executes digital mapping software and maintains a digital map of an operation environment stored in memory. The mapping software, when executed, causes the robot 102 to generate a robot-readable map of its location and/or a route to a destination. In an embodiment, the mapping software instructs the robot 102 to traverse or explore its environment using the onboard sensors. In an embodiment, based on the traversal, the mapping software generates a map of a floor or other environment. In an embodiment, data representing locations in the environment, objects or obstacles may be stored in association with cost values or weight values.

In an embodiment, the environment includes a robot port having a robot port computer. The robot port is a device in which, or next to which, the robot 102 returns when not in use. In an embodiment, the robot port may include connections to which the robot 102 can automatically connect and that charge a battery of the robot 102. For example, the robot and port may be structured to enable the robot to automatically contact the power connections when the port is reached or mechanically engaged.

In an embodiment, the port further comprises a data interface and data connector to which the robot 102 may automatically connect or engage when the robot is in the port. Or, the robot 102 may have internal wireless networking circuitry that is interfaced to its CPU and appropriate software to permit the robot to establish a wireless network connection to a nearby access point and thereby reach a host computer to upload or download data. In another configuration, the robot may communicate with a cloud machine though a common wireless network carrier though an LTE or 3G network. In an embodiment, using the data interface of the port or the wireless interface the robot port computer 104 may download from the robot 102 data comprising a list of deliveries, a history of the robot's, and communications between the robot and other computers or received via the GUI. In some instances, the robot port computer 104 or host computer may upload data to the robot 102 including, for example, software updates, map or facility updates, and data used to identify building-specific features such as doors. In some embodiments, port computer 104 or another host computer is programmed to obtain, via a network, environment data for environments other than the one in which robot 102 is located, including traversal data obtained from other robots that have operated in other environments. The other environments may be closely similar to the local environment or different. For example, if the local environment is a building structure that has been constructed according to a plan that has been replicated to construct other similar buildings in other locations, then traversal data obtained from other robots that are geographically distant may be relevant in resolving traversal of obstructions or features of the local environment. Furthermore, robot port computer 104 may act as an intermediary to communicate data between robots 102 deployed within the building or on campus.

In an embodiment, a facilities access computer 106 provides access to building features that accommodate the robot 102. The facilities access computer 106 may provide an application programming interface (API) that the robot 102 is programmed to call with instructions and data configured to direct the facilities access computer to operate elevators, request operation of electronic doors, or control security sensors. In an embodiment, the facilities access computer 106 communicates with the electronic systems within the building such as elevators, door locks, door opening systems, security sensors, and the like.

In an embodiment, facilities computer 108 is programmed with supervisory functions for one or more robots 102, and provides an interface for an operator to communicate with the robot. The facilities computer 108 may be programmed to respond to requests made by the robot 102 during autonomous mapping. The facilities computer 108 may deploy the robot 102 on pick-ups, deliveries, or other tasks.

In some embodiments, the facilities computer 108 may provide data regarding the location of temporary obstacles in the environment. Examples include holiday decorations, large crowds, and temporary installations. In some embodiments, the facilities computer 108 is programmed to receive data from sensors around the building or campus including, for example, moisture sensors, smoke detectors, security cameras, and the like. Additionally, the facilities computer 108 may have access to data describing the time and location of scheduled events such as carpet cleanings, irrigation schedules, and ongoing construction. The data may be maintained in a persistent memory or database and associated with an anticipated expiration date and/or time. The data may be communicated directly to the robot 102 via wireless communications or using the robot port computer 104.

In an embodiment, a remote computer 110 in FIG. 1 comprises a computer that is not local to the robot 102 and is not located within the building or campus in which the robot 102 is deployed. In an embodiment, a remote computer 102 may communicate data to the robot 102 such as, for example, weather data, news and public interest stories, other sources that provide data used by the robot 102. In some instances, a remote computer 110 may be, or communicate with, a personal electronic device of a human user who has arranged a delivery. In such instances, the remote computer 110 may be a Short Message Service (SMS) server, Multimedia Message Service (MMS) server, a web server, or an application server.

3. Route Planning Process

Figure 2:
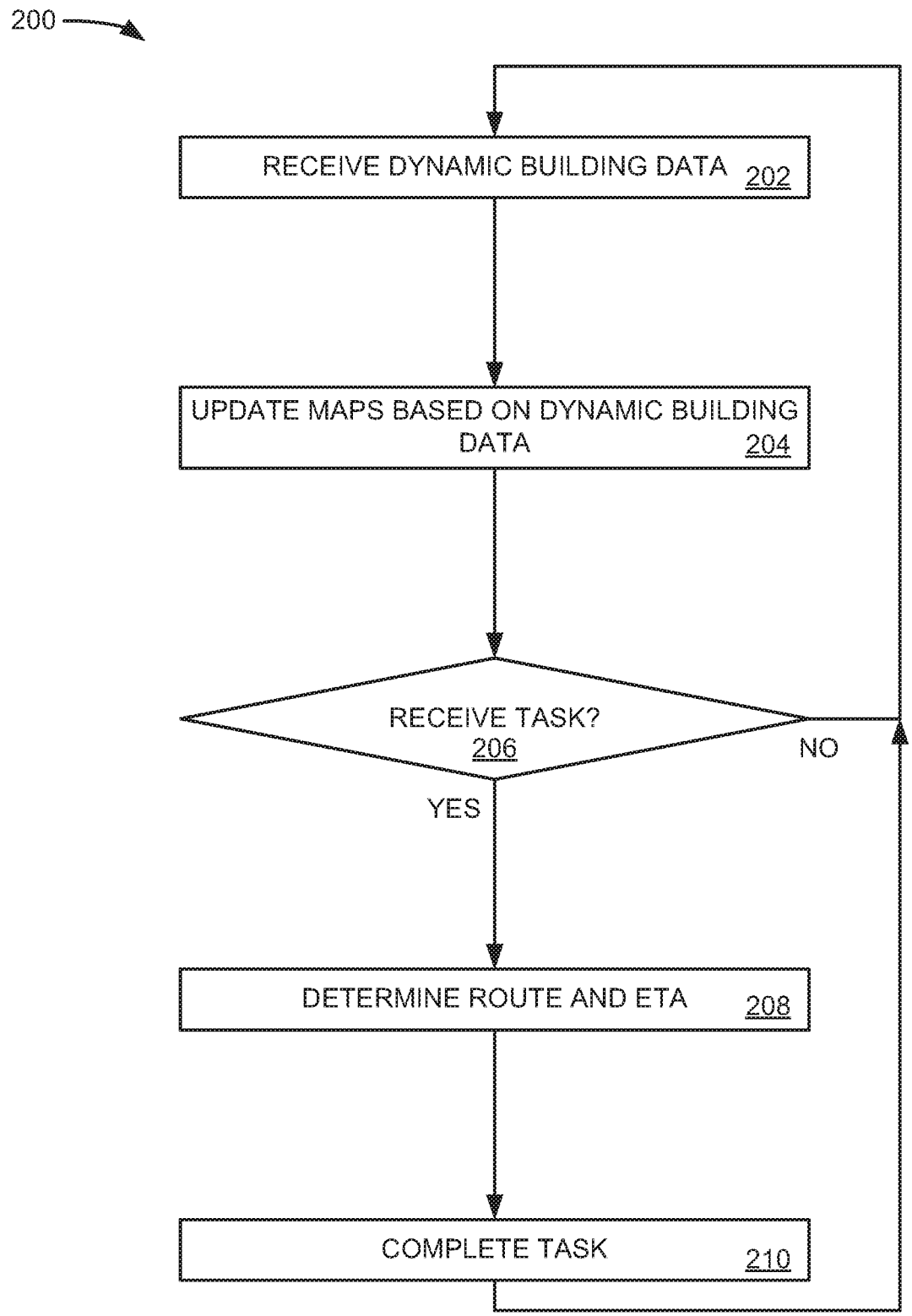
FIG. 2 is a flowchart of an example process for using dynamic data to plan a route taken by a robot, according to some embodiments.

FIG. 2 is a flowchart of an example process for autonomously mapping a floor of a building, according to some embodiments.

In an embodiment, a process 200 as seen in FIG. 2 may be performed by a robot 102 to generate a floor map used in planning a route through a building or campus having a set of buildings connected by robot-navigable pathways. FIG. 2, and each other flow diagram in this disclosure, is intended to describe an algorithm or functional process that can be used as a basis of preparing one or more computer programs for the robot 102 or other computing elements of the environment of FIG. 1. Furthermore, FIG. 2 is expressed at the same level of detail that is typically used, by persons of ordinary skill in the art to which this disclosure pertains, to communicate among themselves about and understand the general plans, specifications, and algorithms that they will later be capable of using to define specific code, instructions or other details of programming the robot 102 or other computing elements of the environment of FIG. 1.

In an operation 202, robot 102 obtains or receives dynamic building data. The dynamic building data may be received from a facilities computer 108, a remote computer 110, from other robots 102, or from other robots 102, wirelessly or via the robot port computer 104. In one embodiment, one or more of these computers may use push notifications or other affirmative messaging systems to transmit the dynamic building data to the robot 102 for analysis and use in digital mapping. In another embodiment, the robot 102 may periodically transmit one or more polling messages to any of the aforementioned computers to request then-current dynamic building data. In still another embodiment, the robot 102 may autonomously periodically initiate one or more calls to programmatic APIs, using wireless network messages that contain a parameterized URL or other payload that is sufficient to directly call a data service of a remotely located computer that is also coupled to the public internet, or to a networked computer that is associated with a building, campus, or other aspect of the local operating environment. For example, robot 102 may be programmed to form, internally, an HTTP request that contains a parameterized URL as a payload and that is configured to call a remote weather data service computer and to request then-current weather conditions that are associated with the robot's local operating environment. The robot may be programmed to receive a response message that contains structured data describing local weather conditions and to extract values such as current precipitation, forecasted precipitation, or other current or forecasted conditions that may affect operation of the robot in the local environment. The same request-response process may be used for other data sources such as facilities computer 108, remote computer 110, digital weather stations, or other computers that are associated with or configured to store and serve local building information, local environment information, or data that has been sensed and reported by other robots in or near the same operating environment.

Example dynamic building data that may be received from any of the aforementioned data sources, such as facilities computer 108 and remote computer 110, include building schedule data such as carpet cleaning schedules, scheduled renovations to a building area, such as a hallway or room, scheduled events where congestion is expected for a time interval, scheduled events where temporary obstacles, BEO items such as tables, chairs or bars, decorations, or other items will be placed for a time interval, and seasonal decorations resulting in static obstacles for a defined number of weeks. The dynamic building data may include latitude-longitude values and/or room designations for a location of an obstacle and/or a time period associated with the obstacle.

Additionally or alternatively, dynamic building data may include local weather data such as precipitation, wind direction and speed, and outdoor temperatures.

Data received from other robots 102 may include real-time sensor data associated with locations within the campus or building. The sensor data may include data indicating a large crowd of people, a spill, actual weather conditions, and the like.

In an operation 204, the robot 102 updates a robot-readable digital map based on the dynamic building data. Operation 204 may comprise updating a cost table or cost map that is maintained separately from digital geographical map data. In an embodiment, a robot-readable map comprises stored digital data comprising feature items representing physical features where each feature item is associated with a cost, where cost values are maintained either directly in geographical map data or in a separate cost table or cost map. The specific data structures that are used in various embodiments are not critical, and others may be used, provided that the robot 102 stores data relating to costs for features in an operating environment, with some form of link or association to location data indicating a physical or geographical location or position of the features. Some feature items have a stationary cost. For example, feature items corresponding to walls may have a permanent, fixed cost.

Other feature items may have a variable cost that is adjusted or modified according to the dynamic building data that is received. For example, assume the dynamic building data indicates an event is scheduled that would cause increased congestion in a particular area. Based on the dynamic building data, the cost associated with one or more feature items corresponding to the particular area may be increased to reflect an increased difficulty in navigating the location associated with the feature item. The cost associated with a particular pixel affected by the dynamic building data may lower to reflect a decreased difficulty in navigating a location associated with the feature item if an obstacle is removed.

In an embodiment, to determine a new cost associated with each of the obstacles associated with the dynamic building data, multiple layers of maps are generated, each layer being generated from a different source of dynamic building data and having a different cost associated with each feature item. For example, a layer generated from weather data may have variable costs for feature items corresponding to outdoor areas and zero costs for walls and other permanent obstacles. The variable costs may be based on the weather conditions. For example, a light breeze is associated with a lower cost than pouring rain.

To calculate a cost associated with a particular pixel across all of the layers of the maps, the costs associated with each pixel is summed. For each pixel, the cost associated with the pixel is:

$$C_p = \Sigma(C_o, C_a, C_b, \ldots)$$

where $C_p$ is the total cost associated with the pixel, $C_o$ is the cost associated with the pixel without considering the dynamic building data, $C_a$ is the cost associated with first dynamic building data, $C_b$ is the cost associated with second dynamic building data. Additional dynamic building data may be added to this sum as the robot 102 receives additional dynamic building data.

In some embodiments, the map may comprise pixels in a grid, or a graph of nodes connected by edges. The costs are associated with nodes and/or edges using the techniques described above.

In an operation 206, the robot 102 determines whether it has received a task from a human or computer operator. The task may be a pick-up of an item to be delivered elsewhere or a delivery of an item to another location in the campus or building. The task may be received via WIFI or another communications network. The task includes an identification of its origin location and its destination location. If no task is received, the process 200 returns to operation 202.

If a task is received, in an operation 208, the robot 102 determines a route and estimated time of arrival (ETA). For a delivery, the ETA is based on an amount of time required to go from the origin location to the destination location. For a pick-up task, the origin location is a current location and a destination location is a pick-up location. For a delivery task, the origin location is a current location of the item to be delivered, e.g., a front desk or storage room.

The route and ETA are determined by the robot using a graph search algorithm. Examples of graph search algorithms that can be used with a grid or node-network map include, but are not limited to, Dijkstra, A-Star (A*), D-Star, and D-Star Lite. These algorithms determine a travel time using multiple possible routes by calculating velocities over the various paths. In addition, ETA values may be used to sort a plurality of different available routes and select a best route, or may be displayed using the touchscreen display of robot 102. The algorithms calculate an angular and linear velocity where the velocity over portions of the routes changes based on the total cost associated with the pixels. In one embodiment, robot 102 takes the route associated with the shortest travel time, that is, the fastest route. In another embodiment, the route is determined as an optimized route from the current location to the destination location that traverses a fewest number of personnel locations in the building or campus in which personnel are likely to be located; this approach causes the robot to minimize disruption with human personnel and/or reduces the risk of disruption of the robot's traversal of the route.

In an operation 210, the robot traverses the selected route to complete the pick-up or delivery task. After the operation 210, the process 200 returns to operation 202. In some embodiments, the robot 102 may continue to perform operations 202 and 204 while performing operations 208, 210.

Thus, in one embodiment, this disclosure provides a computer-implemented method for guiding movement of a robot comprising receiving digitally stored dynamic building data that describes a temporary condition of a building or campus comprising a set of buildings and a location of the temporary condition; updating, from the dynamic building data, one or more map layers among a plurality of map layers of a digital map by calculating an increased cost of navigation of the portion of the map corresponding to the location of the temporary condition, the increased cost based on the description of the temporary condition; in response to receiving a task that is associated with a destination location, determining a route from a current location of the robot to the destination location from the plurality of map layers of the map using a graph search algorithm based in part upon the location of the temporary condition and the increased cost; causing the robot to traverse the route from the current location to the destination location. Other embodiments may involve other steps, functions and operations.

Using these techniques, digital dynamic building data about current operating conditions, weather, objects, obstructions or obstacles, all having some relevance or association to a robot operating environment, may be obtained by a robot, transformed into cost data, and used in programmed algorithms to modify a route, terminate a navigation or traversal, modify a task, and/or form a notification message that is digitally transmitted elsewhere. The physical operation of the robot may be modified based upon the transformation and algorithms so that the robot traverses a different route, does not traverse at all, or takes other responsive action in response to the dynamic building data. Embodiments have specific value and utility in the case of robots that are constructed and programmed for use in protected interior building environments, but may need to traverse unprotected exterior routes or paths between buildings of a campus when adverse weather can impair traversal. In such a case, obtaining and processing the dynamic building data can result in routing the robot on a route that only uses protected interior paths, terminating a traversal, or updating an ETA value. Embodiments also have specific value and utility in operating environments that are subject to the periodic introduction of temporary obstacles into the environment, such as hotels, hospitals and schools. In that case, obtaining and processing the dynamic building data can result in routing the robot on a route that only uses non-obstructed paths or paths where limited human activity is expected, terminating a traversal, or updating an ETA value.

4. Maps

Figure 3:
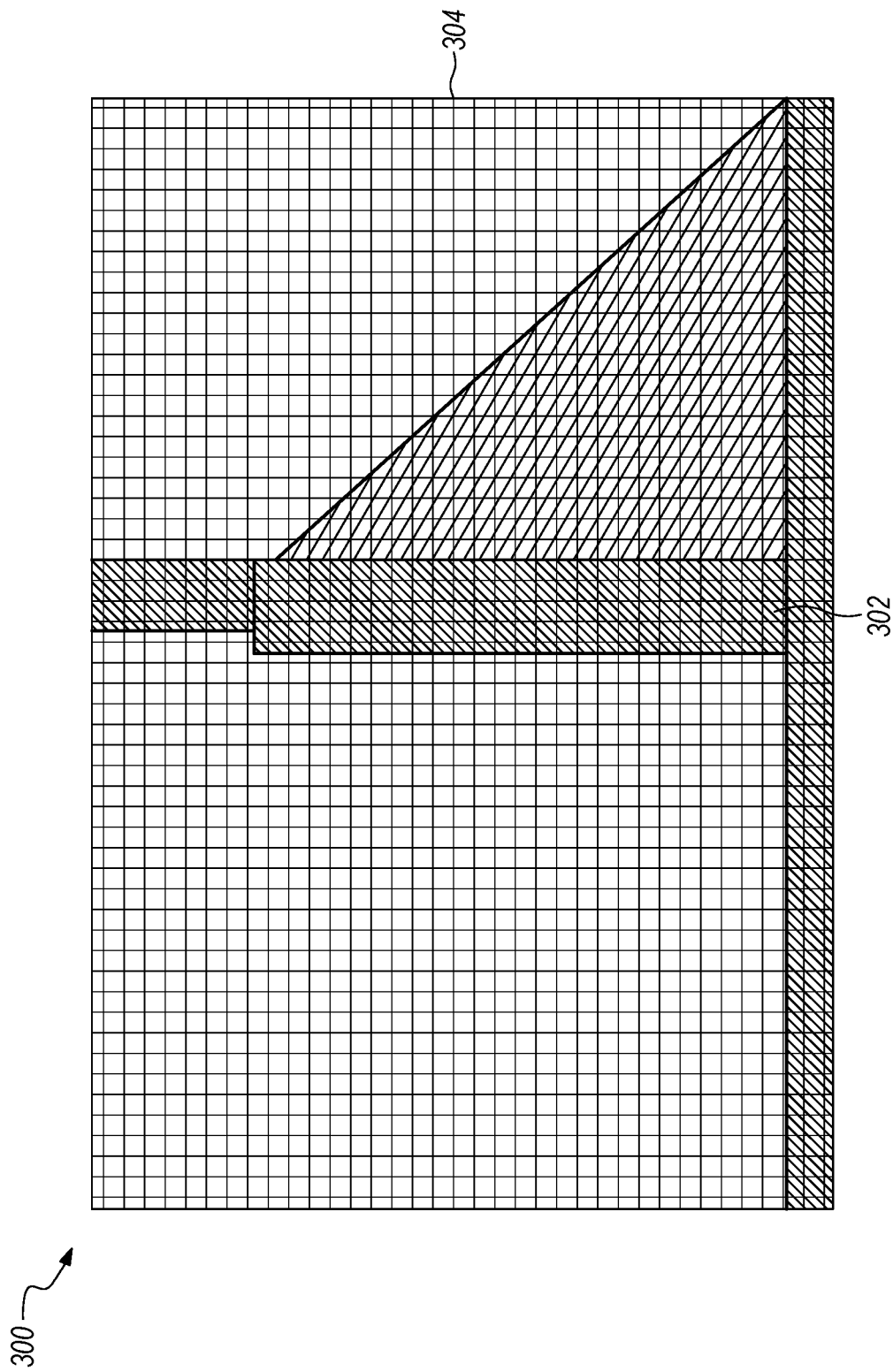
FIG. 3 is a portion of a pixel-level diagram of a robot-generated map under first conditions, according to various embodiments.

FIG. 3 is a portion of a pixel-level diagram of a robot-generated map under first conditions, according to various embodiments. The diagram 300 comprises a grid of pixels each assigned a cost to navigate. The white pixels indicate a zero cost to navigate, meaning that the location corresponds to open space. Dark gray pixels indicate an infinite cost to navigate, indicating that the location corresponds to a wall or prohibited area. The medium gray pixels correspond to areas having an increased, but not infinite, cost to navigate corresponding to a doorway or small area that may be difficult to navigate. In FIG. 3, door 302, when closed, is associated with a high cost. The robot 102 may direct the facilities access computer 106 to open the door 302, reducing the cost associated with the affected pixels. Area 304 may be an outdoor area on the other side of door 302. As depicted, the cost associated with traversing area 304 has a very low cost as would be the case if, for example, the weather is clear and sunny with no wind.

Figure 4:
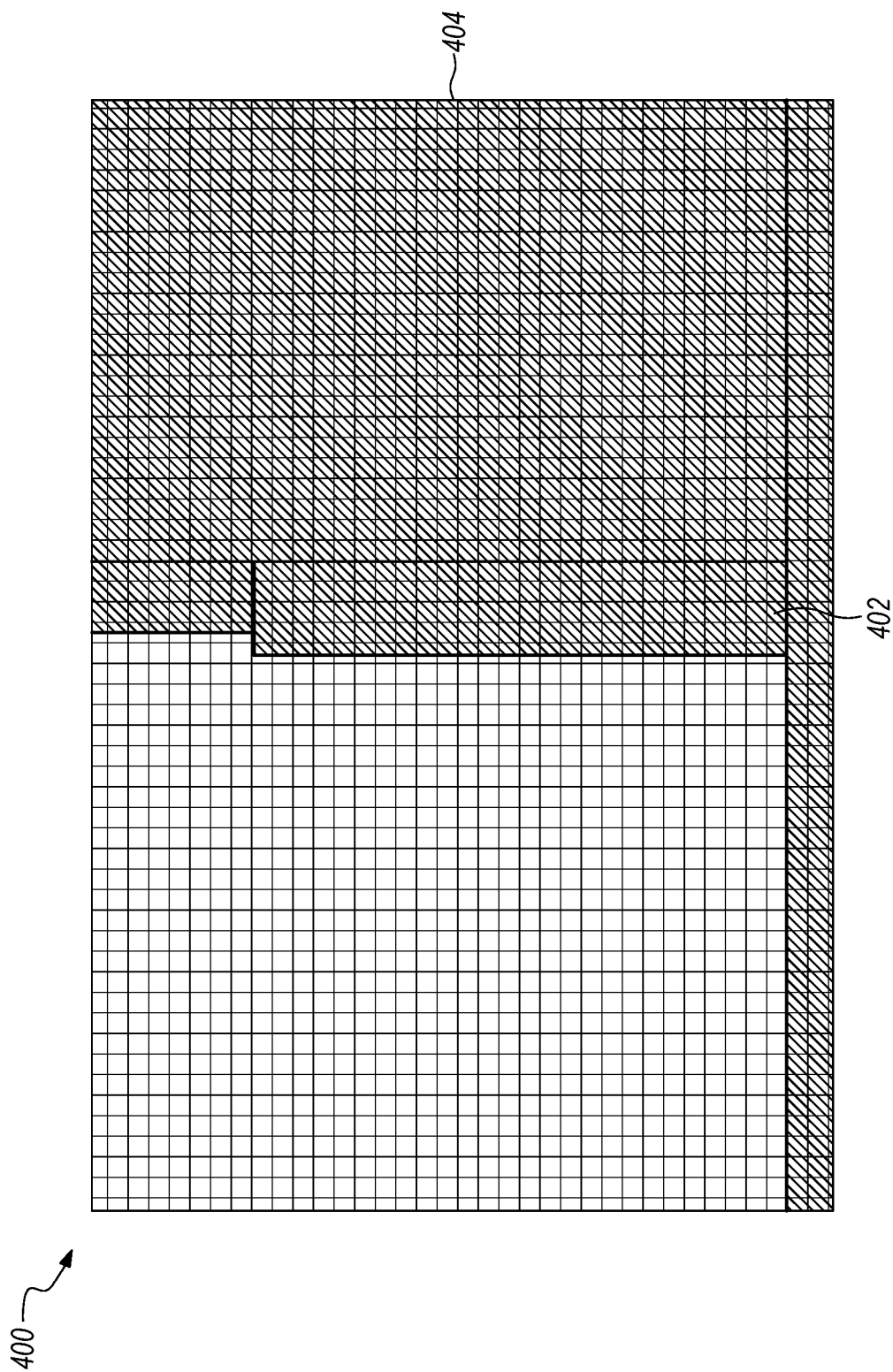
FIG. 4 is a portion of a pixel-level diagram of a robot-generated map under second conditions, according to various embodiments.

FIG. 4 is a portion of a pixel-level diagram of a robot-generated map under second conditions, according to various embodiments. The diagram 400 comprises a grid of pixels each assigned a cost to navigate. The white pixels indicate a zero cost to navigate, meaning that the location corresponds to open space. Dark gray pixels indicate an infinite cost to navigate, indicating that the location corresponds to a wall or prohibited area. The medium gray pixels correspond to areas having an increased, but not infinite, cost to navigate corresponding to a doorway or small area that may be difficult to navigate. In FIG. 4, door 402, when closed, is associated with a high cost. The robot 102 may direct the facilities access computer 106 to open the door 402, reducing the cost associated with the affected pixels. Area 404 may be an outdoor area on the other side of door 402. As depicted, the cost associated with traversing area 404 has a very high cost as would be the case if, for example, the weather is raining or inclement.

Figure 5:
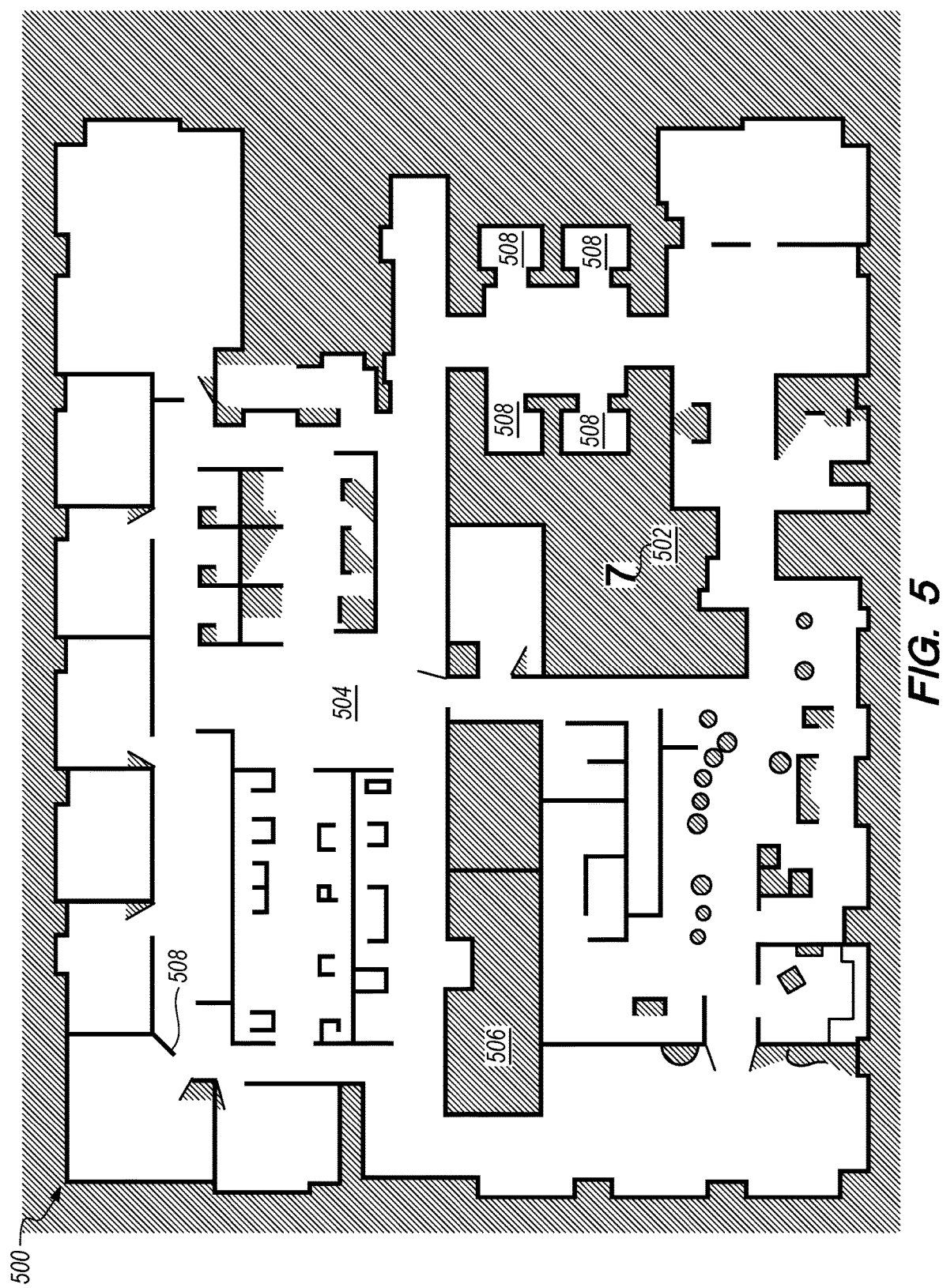
FIG. 5 is an example of a robot-generated map of a floor in a building, according to various embodiments.

FIG. 5 is an example of a robot-generated map 500 of a floor in a building, according to various embodiments. The map 500 includes an annotation 502 of the floor of the building from which the map was generated. White area 504 correspond to spaces that a navigable by the robot including hallway and larger rooms. Gray areas 506 include areas that the robot can navigate within but has a higher cost of doing so. These areas may include, for example, bathrooms, small rooms or corners, or cluttered areas. Black lines 508 correspond to interior or exterior walls. Elevators 508 may be used by the robot 102 to navigate between floors.

The robot-generated map may be updated based on dynamic building data. The pixels corresponding to any affected areas may be modified to indicate an increased or decreased cost of navigation. In an embodiment, the robot-generated map comprises one or more layers. Additional layers reflecting dynamic building data may be layered over map 500. When dynamic building data is received, a layer may be generated based on the dynamic building data. If the dynamic building data is associated with an end time or with a specific time period, the layer may be removed at a specified time.

5. User Interface

FIG. 6 is a portion of an example user interface describing an anticipated route and estimated time of arrival, according to various embodiments. The user interface 600 may be displayed to a user using a touchscreen or other display device on or connected to robot 102. In other embodiments, the user interface 600 may be presented to the user within an application or web application executed by facilities computer 108. In some embodiments, the user interface 600 may be part of a hypertext markup language (HTML) email message or other electronic message sent to a user device. The user interface 600 may be generated by the robot 102 in order to communicate its status with a user. For example, the user interface 600 may be generated to indicate an ETA to an operator. In the illustrated example, user interface 600 comprises a message that says, "Task received. I will arrive at room 314 in 7 minutes. I anticipate a 3 minute delay because weather is making the breezeway too wet for me to navigate. I will be travelling along the service corridor instead."

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
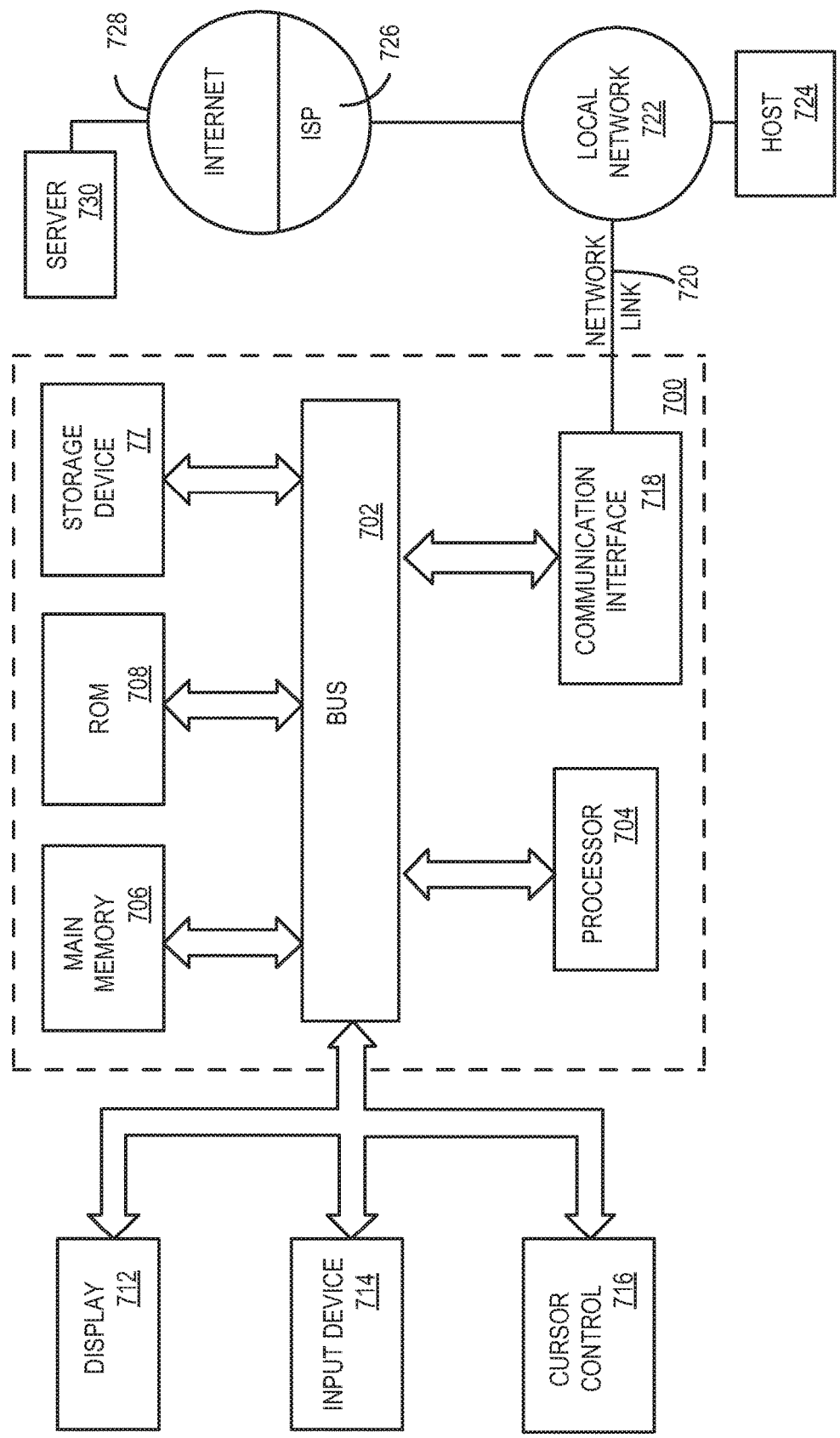
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

(Computer system 800 may be coupled via bus 802 to a display 812, such as a cathode ray tube (CRT) or liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Display 812 may also be touch-enabled for communicating gestures, touch interactions, and other user interactions to processor 804.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information. WiFi or LTE may be used for wireless communication.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for controlling movement of an autonomous robot comprising:
    obtaining digitally stored dynamic building data describing a set of one or more temporary conditions, the dynamic building data comprising, for each temporary condition of the set of one or more temporary conditions, a location of the temporary condition and a description of the temporary location;
    updating, from the dynamic building data, digital cost data associated with one or more features of a digital map by calculating, for each temporary condition of the set of one or more temporary conditions, an increased cost of navigation associated with the location of the temporary condition, the increased cost based on the description of the temporary condition;
    in response to receiving a task that is associated with a destination location, determining a route of the robot to the destination location using the digital map based in part upon the location of each temporary condition of the set of one or more temporary conditions and the increased cost associated with the location, the route not including at least a location of a particular temporary condition of the set of one or more temporary conditions;
    causing the robot to traverse to the destination location using the route.

2. The method of claim 1, further comprising determining the route as a fastest route from a current location of the robot to the destination location, by calculating, for each temporary condition of the set of one or more temporary conditions, an expected velocity of the robot over a portion of the digital map corresponding to the location of the temporary condition.

3. The method of claim 1 further comprising determining the route as a shortest route from a current location of the robot to the destination location by calculating a plurality of different routes having different estimated time of arrival (ETA) values, each different route in the plurality of different routes not including the location of one or more temporary conditions of the set of one or more temporary conditions.

4. The method of claim 1, further comprising determining the route as an optimized route from a current location of the robot to the destination location that traverses a fewest number of locations in which personnel are likely to be located and not including at least the location of a particular temporary condition of the set of one or more temporary conditions.

5. The method of claim 1, wherein the dynamic building data comprises weather data received from a remote computer and the set of one or more temporary conditions includes a weather condition.

6. The method of claim 1, wherein the dynamic building data comprises data collected by another robot traversing an area associated with the digital map.

7. The method of claim 1, wherein the dynamic building data comprises data detected by sensors within an area associated with the digital map.

8. The method of claim 1, wherein the dynamic building data further comprises, for each temporary condition of the set of one or more temporary conditions, a time frame of the temporary condition.

9. The method of claim 8, wherein determining the route is based on the current time and the time frame of each temporary condition of the set of one or more temporary conditions.

10. The method of claim 8, further comprising calculating an estimated time of arrival from a current location of the robot to the location of each temporary condition of the set of one or more temporary conditions, and wherein determining the route is based on the estimated time of arrival to the location of each temporary condition of the set of one or more temporary conditions and the time frame of each temporary condition of the set of one or more temporary conditions.

11. A computer system comprising:
    one or more processors;
    a non-transitory computer-readable medium coupled to the one or more processors and storing one or more sequences of program instructions which, when executed by the one or more processors, cause the one or more processors to perform:
    obtaining digitally stored dynamic building data describing a set of one or more temporary conditions, the dynamic building data comprising, for each temporary condition of the set of one or more temporary conditions, a location of the temporary condition and a description of the temporary location;
    updating, from the dynamic building data, digital cost data associated with one or more features of a digital map by calculating, for each temporary condition of the set of one or more temporary conditions, an increased cost of navigation associated with the location of the temporary condition, the increased cost based on the description of the temporary condition;
    in response to receiving a task that is associated with a destination location, determining a route of a robot to the destination location using the digital map based in part upon the location of each temporary condition of the set of one or more temporary conditions and the increased cost associated with the location, the route not including at least a location of a particular temporary condition of the set of one or more temporary conditions;
    causing the robot to traverse to the destination location using the route.

12. The system of claim 11, further comprising instructions which when executed cause determining the route as a fastest route from a current location of the robot to the destination location, by calculating, for each temporary condition of the set of one or more temporary conditions, an expected velocity of the robot over a portion of the digital map corresponding to the location of the temporary condition.

13. The system of claim 11 further comprising instructions which when executed cause determining the route as a shortest route from a current location of the robot to the destination location by calculating a plurality of different routes having different estimated time of arrival (ETA) values, each different route in the plurality of different routes not including the location of one or more temporary conditions of the set of one or more temporary conditions.

14. The system of claim 11, further comprising instructions which when executed cause determining the route as an optimized route from a current location of the robot to the destination location that traverses a fewest number of locations in which personnel are likely to be located and not including at least the location of a particular temporary condition of the set of one or more temporary conditions.

15. The system of claim 11, wherein the dynamic building data comprises weather data received from a remote computer and the set of one or more temporary conditions includes a weather condition.

16. The system of claim 11, wherein the dynamic building data comprises data collected by another robot traversing an area associated with the digital map.

17. The system of claim 11, wherein the dynamic building data comprises data detected by sensors within an area associated with the digital map.

18. The system of claim 11, wherein the dynamic building data further comprises, for each temporary condition of the set of one or more temporary conditions, a time frame of the temporary condition.

19. The system of claim 18, wherein determining the route is based on the current time and the time frame of each temporary condition of the set of one or more temporary conditions.

20. The system of claim 18, further comprising instructions which when executed cause calculating an estimated time of arrival from a current location of the robot to the location of each temporary condition of the set of one or more temporary conditions, and wherein determining the route is based on the estimated time of arrival to the location of each temporary condition of the set of one or more temporary conditions and the time frame of each temporary condition of the set of one or more temporary conditions.

* * * * *